(12) United States Patent
Chung et al.

(10) Patent No.: US 11,639,453 B2
(45) Date of Patent: May 2, 2023

(54) ELECTRICALLY CONDUCTING POLYMERS

(71) Applicant: Florida State University Research Foundation, Inc., Tallahassee, FL (US)

(72) Inventors: Hoyong Chung, Tallahassee, FL (US); Minkyu Kim, Atlanta, GA (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 192 days.

(21) Appl. No.: 17/284,557

(22) PCT Filed: Oct. 15, 2019

(86) PCT No.: PCT/US2019/056229
§ 371 (c)(1),
(2) Date: Apr. 12, 2021

(87) PCT Pub. No.: WO2020/081507
PCT Pub. Date: Apr. 23, 2020

(65) Prior Publication Data
US 2021/0317352 A1 Oct. 14, 2021

Related U.S. Application Data

(60) Provisional application No. 62/745,818, filed on Oct. 15, 2018.

(51) Int. Cl.
| | |
|---|---|
| C09J 181/02 | (2006.01) |
| C09J 9/02 | (2006.01) |
| C09J 133/08 | (2006.01) |
| C09J 133/12 | (2006.01) |
| H01B 1/12 | (2006.01) |
| H01B 5/14 | (2006.01) |

(52) U.S. Cl.
CPC .............. *C09J 181/02* (2013.01); *C09J 9/02* (2013.01); *C09J 133/08* (2013.01); *C09J 133/12* (2013.01); *H01B 1/12* (2013.01); *H01B 1/122* (2013.01); *H01B 1/127* (2013.01); *H01B 5/14* (2013.01); *C09J 2203/326* (2013.01); *C09J 2301/314* (2020.08); *C09J 2481/00* (2013.01)

(58) Field of Classification Search
None
See application file for complete search history.

(56) References Cited

U.S. PATENT DOCUMENTS

| | | | |
|---|---|---|---|
| 2009/0294735 A1 | 12/2009 | Yoshida et al. | |
| 2016/0177109 A1* | 6/2016 | Hendricks | ........... C04B 41/4849 |
| | | | 252/514 |

FOREIGN PATENT DOCUMENTS

JP  3966171 B2 * 8/2007

OTHER PUBLICATIONS

English machine translation of Kubota et al. (JP-3966171-B2) accessed within PE2E Search; PDF is attached to the case file. (Year: 2007).*

(Continued)

*Primary Examiner* — Katie L. Hammer
(74) *Attorney, Agent, or Firm* — Christopher M. Ramsey; GrayRobinson, P.A.

(57) ABSTRACT

An electrically conductive material includes an anionic polymer having a polymer backbone that is bonded to a plurality of terminal catechol moieties and a plurality of terminal sulfonate moieties. It also includes a cationic polymer including poly(3,4-ethylenedioxythiophene).

26 Claims, 9 Drawing Sheets

(56) References Cited

OTHER PUBLICATIONS

Harper et al.; "Single-Phase Photo-Cross-Linkable Bioinspired Adhesive for Precise Control of Adhesion Strength"; ACS Applied Materials & Interfaces; vol. 9; pp. 1830-1839; Dec. 14, 2016.
International Search Report dated Jan. 9, 2020 for PCT/US2019/056229.
Kim et al.; "Metal-Free Electrically Conductive Bioinspired Adhesive Polymers"; Chemistry of Materials; vol. 31, No. 20; Sep. 20, 2019.
Lu et al.: Poly(3,4-ethylenedioxythiophene)poly(styrenesulfonate)-poly(vinyl) alcohol) poly (acrylic acid) interpenetrating polymer networks for improving optrode-neural tissue interface in optogenetics; Biomaterials, vol. 33; pp. 378-394; Oct. 20, 2011.
Pramudya; Synthesis of Bioinspired Polymeric Adhesive for Finely Tunable Adhesion, Mechanical Optical and Electrically Conductive Properties; Dissertation submitted to the Department of Chemical Biomedical Engineering of Florida State University; Nov. 15, 2018.

* cited by examiner

ELECTRICALLY CONDUCTING POLYMERS

CROSS-REFERENCE TO RELATED APPLICATION

This is the US national stage application of International Application No. PCT/US2019/056229, filed Oct. 15, 2019, which claims the benefit of priority from U.S. provisional Application No. 62/745,818, filed Oct. 15, 2018. The entire contents of these prior applications are incorporated by reference.

FIELD

This relates to the field of polymer chemistry and, more particularly to electrically conducting polymers.

BACKGROUND

Soldering is essential to electronics manufacturing. It provides the electrical and physical binding between printed circuit boards (PCBs) and electronic components and is used to repair damaged electrical connections. Although great improvements have been made to conventional metal soldering technology, many drawbacks still remain.

Electrically conductive adhesives ("ECAs") are alternatives to metal solders. ECAs are typically prepared by mixing an electrically conductive filler and an adhesive polymer matrix. The polymer matrix provides adhesion to substrates. Unfortunately, both the fillers and polymer matrices pose challenges. The filler, which is required to be present in a large amount can be expensive. The filler may also aggregate and create open circuits. The filler may also oxidize. Further, the polymer matrix often has a high curing temperature.

Intrinsically conducting polymers ("ICPs") are electrically conducting polymers that have a fully conjugated structure enabling them to conduct electricity. One example of an ICP, poly(3,4-ethylenedioxythiophene):poly(styrenesulfonate) ("PEDOT:PSS"), has recently gained interest because it is processable in solution, thermally stabile, biocompatible, and has good electrical conductivity.

PEDOT:PSS is an electrically conductive and water-soluble polyelectrolyte complex composed of positively charged poly(3,4-ethylenedioxythiophene) ("PEDOT") and the polyanion poly(styrenesulfonate) ("PSS"). In the PEDOT:PSS system, PSS balances with the positively charged PEDOT molecule and the sulfonate groups renders the complex water-soluble. PEDOT makes the complex electrically conductive.

BRIEF SUMMARY

Disclosed here is an improved electrically conductive polymer with enhanced electrical conductivity and adhesion properties.

An example of this advantageous electrically conductive material includes (a) an anionic polymer having a polymer backbone, a plurality of terminal catechol moieties bonded to the polymer backbone, and a plurality of terminal sulfonate moieties bonded to the polymer backbone; and (b) a cationic polymer including poly(3,4-ethylenedioxythiophene).

Additional examples of the electrically conductive material may include one or more of the following features.

The polymer backbone may include at least one of polymethylmethacrylate and polyacrylic acid.

The plurality of terminal catechol moieties bonded to the polymer backbone may include N-methacryloyl-3,4-dihydroxyl-L-phenylalanine (MDOPA).

The plurality of terminal sulfonate moieties bonded to the polymer backbone may include 3-sulfoalkyl methacrylate.

The 3-sulfoalkyl methacrylate may be 3-sulfopropyl methacrylate.

A polar organic solvent effective for increasing an electrical conductivity of the electrically conductive material relative to the electrical conductivity of the electrically conductive material without the solvent may be included.

The solvent may be selected from at least one of glycerol, dimethylsulfoxide, and ethylene glycol.

The composition including the material may material further include electrical wiring wherein the electrically conductive material is adhered to the electrical wiring.

The polymer backbone may include at least one of polymethylmethacrylate and polyacrylic acid, the plurality of terminal catechol moieties bonded to the polymer backbone may include N-methacryloyl-3,4-dihydroxyl-L-phenylalanine (MDOPA), and the plurality of terminal sulfonate moieties bonded to the polymer backbone may include 3-sulfoalkyl methacrylate.

An advantageous product aspect comprises an electrically conductive adhesive material including a cationic electrically conductive polymer including poly(3,4-ethylenedioxythiophene) (PEDOT) and an anionic polymer including a combination of poly(N-methacryloyl-3,4-dihydroxyl-L-phenylalanine) (PMDOPA) and poly(3-sulfopropyl methacrylate) (PSPM).

Additional examples of the product may include one or more of the following features.

The molecular weight of the electrically conductive adhesive material may be 5000 Dalton to 5,000,000 Dalton.

A polar organic solvent effective for increasing an electrical conductivity of the electrically conductive adhesive material relative to the electrical conductivity of the electrically conductive adhesive material without the solvent may be included in the electrically conductive material.

The solvent may be selected from at least one of glycerol, dimethylsulfoxide, and ethylene glycol.

The product may further include electrical wiring wherein the electrically conductive material is adhered to the electrical wiring.

An advantageous method comprises forming an electrically conductive connection between at least two electrical conductors by contacting the electrical conductors with an electrically conductive material including (a) an anionic polymer having a polymer backbone, a plurality of terminal catechol moieties bonded to the polymer backbone, and a plurality of terminal sulfonate moieties bonded to the polymer backbone; and (b) a cationic polymer including poly(3,4-ethylenedioxythiophene).

Additional examples of this method may include one or more of the following features.

The polymer backbone may include at least one of polymethylmethacrylate and polyacrylic acid.

The plurality of terminal catechol moieties bonded to the polymer backbone may include N-methacryloyl-3,4-dihydroxyl-L-phenylalanine (MDOPA).

The plurality of terminal sulfonate moieties bonded to the polymer backbone may include 3-sulfoalkyl methacrylate.

The 3-sulfoalkyl methacrylate may be 3-sulfopropyl methacrylate.

The electrically conductive material may include a polar organic solvent effective for increasing an electrical conductivity of the electrically conductive material relative to the electrical conductivity of the electrically conductive material without the solvent.

The solvent may be selected from at least one of glycerol, dimethylsulfoxide, and ethylene glycol.

The polymer backbone may include at least one of polymethylmethacrylate and polyacrylic acid, the plurality of terminal catechol moieties bonded to the polymer backbone may include N-methacryloyl-3,4-dihydroxyl-L-phenylalanine (MDOPA), and the plurality of terminal sulfonate moieties bonded to the polymer backbone may include 3-sulfoalkyl methacrylate.

An advantageous method of making an electrically conductive material, comprises (a) preparing poly(N-methacryloyl-3,4-bis(tert-butyldimethylsilyloxy)-L-phenylalanine-co-3-sulfopropyl methacrylate) (PMTS) by free radical polymerization of N-methacryloyl-3,4-bis(tert-butyldimethylsilyloxy)-L-phenylalanine (MDOPA(TBDMS)$_2$) and 3-sulfoalkyl methacrylate;

(b) producing poly(N-methacryloyl-3,4-bis(tert-butyldimethylsilyloxy)-L-phenylalanine-co-3-sulfopropyl methacrylate):poly(3,4-ethylenedioxythiophene) (PMTS:PEDOT) by oxidative polymerization of 3,4-ethylenedioxythiophene (EDOT) in a solution of PMTS; and (c) removing silyl protecting groups of PMTS to yield poly(N-methacryloyl-3,4-dihydroxyl-L-phenylalanine-co-3-sulfopropyl methacrylate):poly(3,4-ethylenedioxythiophene) (PMS:PEDOT).

Additional examples of this method may include one or more of the following features.

The free radical polymerization may be initiated using azobisisobutyronitrile (AIBN) when the reaction temperature is from 60° C. to 100° C.

The oxidative polymerization of EDOT may be initiated using a persulfate salt.

The alkyl group of 3-sulfoalkyl methacrylate may be selected from alkyl groups having from 1 to 10 carbon atoms.

DESCRIPTION OF EXAMPLE EMBODIMENTS

Figure 1:
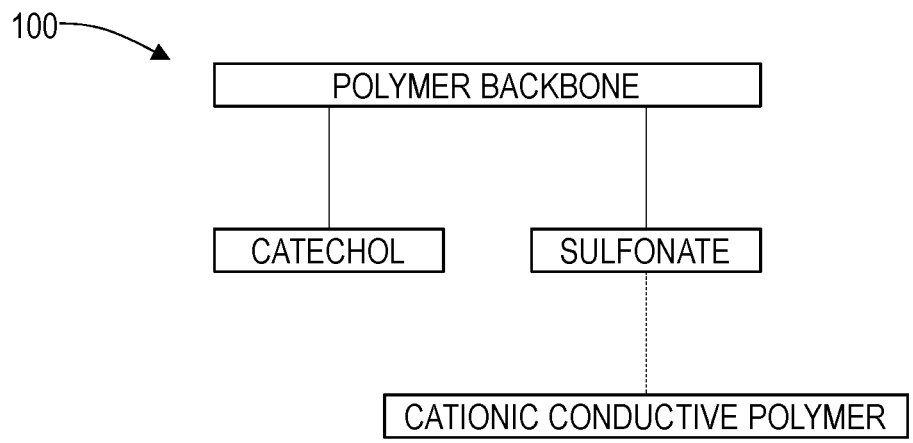
FIG. 1 is block diagram of an example of the electrically conductive material.

Referring to FIG. 1, the advantageous electrically conductive material 100 includes a polymer backbone having covalently bonded thereto a plurality of terminal catechol-containing moieties and a plurality of sulfonate-containing moieties. A cationic conductive polymer is ionically bonded with the sulfonate-containing moieties to form a conductive polymer complex.

The polymer backbone forms the backbone or base structure of the material to which other functional moieties may be appended. The polymer backbone may be composed of one or more polymers including carboxylic acid functional groups. Although there are many possible examples that may be employed, specific examples of polymers suitable for the polymer backbone include, but are not limited to, at least one of polymethylmethacrylate (PMMA), polyacrylic acid (PAA), and derivatives thereof. Such derivatives need not be PMMA or PAA themselves, so long as the polymer backbone is based on the PMMA and/or PAA structure and has carboxylic or carboxylate groups to which other functional groups may be appended.

The terminal catechol moieties bonded to the polymer backbone are selected to provide adhesion of the conductive polymer complex to a substrate surface. There are many catechol moieties that may be used, such as those having a terminal catechol group functionalized with group that can bond to a carboxylic acid group of the polymer backbone. In certain examples, the catechol moieties may include 3,4-dihydroxyl-L-phenylalanine ("DOPA"), N-methacryloyl-3,4-dihydroxyl-L-phenylalanine ("MDOPA"), and/or a derivative thereof. Such derivatives may include functional groups appended to the DOPA or MDOPA structure that retain the surface adhesion properties of the derivative.

The terminal sulfonate moieties bonded to the polymer backbone are adapted to make the material water soluble and to provide anionicity to the material for making ionic bonds with the cationic conductive polymer. In certain examples, the terminal sulfonate moieties may include a 3-sulfoalkyl methacrylate and/or a derivative thereof. The alkyl group may be selected from alkyl groups having from 1 to 10 carbon atoms. In a particular example the 3-sulfoalkyl methacrylate is 3-sulfopropyl methacrylate ("SPM").

The amount of the terminal sulfonate moieties and terminal catechol moieties on the polymer backbone may affect the properties of the conductive polymer material. In certain examples, the amount of the terminal catechol moiety, by mole % of the polymer, is 1% to 50%, 1% to 30%, 1% to 25%, 5% to 30%, 5% to 25%, 5% to 20%, 10% to 50%, 10% to 30%, 10% to 25%, 10% to 20%. In a particular, but non-limiting example, the terminal catechol moiety is 15 mole % of the polymer.

In certain examples, the amount of the terminal sulfonate moieties, by mole % of the polymer, is 1% to 50%, 1% to 30%, 1% to 25%, 5% to 30%, 5% to 25%, 5% to 20%, 10% to 50%, 10% to 30%, 10% to 25%, 10% to 20%. In a particular, but non-limiting example, the terminal sulfonate moiety is 15 mole % of the polymer.

The cationic conductive polymer may be an electrically conductive polythiophene polymer, such as poly(3,4-ethylenedioxythiophene) ("PEDOT"). It is to be understood that the material may include PEDOT itself or a derivative thereof. In such a derivative, PEDOT forms the basis of the conducting polymer's structure but PEDOT may be modified from its original form with different functional groups.

A polar organic solvent may be included in the electrically conductive material to modulate the electrical conductivity of the material. The solvent assists with a phase-like separation of hydrophobic and hydrophilic portions of the electrically conductive material. In some cases, the solvent enhances the electrical conductivity of the material relative to the electrical conductivity of the electrically conductive material without the solvent. Examples of polar organic solvents that may be used include, but are not limited to, at least one of glycerol, dimethylsulfoxide, and ethylene glycol, and the like.

The amount of solvent in the material can vary depending on the desired properties. In certain examples, no solvent is included. In other examples the solvent may be 1% w/w to 75% w/w, 10% w/w to 75% w/w, 20% w/w to 75% w/w, 20% w/w to 75% w/w, or 30% w/w to 70% w/w. Here, the % w/w is the weight % of the solvent relative to the total mass of the electrically conductive material/solvent combination. In some examples, the solvent may increase the electrical conductivity of the electrically conductive material relative to when no solvent is included.

In some examples, the electrically conductive material may be substantially metal free. This term "substantially metal free" means the material includes only trace amounts of metals or no detectable amounts of metal.

In a particular example of the electrically conductive material, the polymer backbone is PMMA, the catechol moiety MDOPA, the sulfonate moiety is SPM, and the conductive polymer is PEDOT.

In another a particular example, glycerol is included and is present in an amount of 35% w/w to 45% w/w of the solvent/electrically conductive material combination.

The molecular weight of the electrically conductive material may be varied depending on the desired properties of the material. In certain examples, the molecular weight is 5000 Dalton to 5,000,000 Dalton. It is to be understood that this range does not limit the scope of possible molecular weights that may be employed.

The electrically conductive material may be used to form electrical connections in electronic devices or on biological surfaces. The catechol moieties allow the electrically conductive material to adhere to a diverse array of material substrates such as printed circuit boards, semiconductors, plastics, glass, wood, metals, ceramics, papers, human and animal skin, and biological tissues such as organs, muscles, and nerves, among many others.

Figure 2:
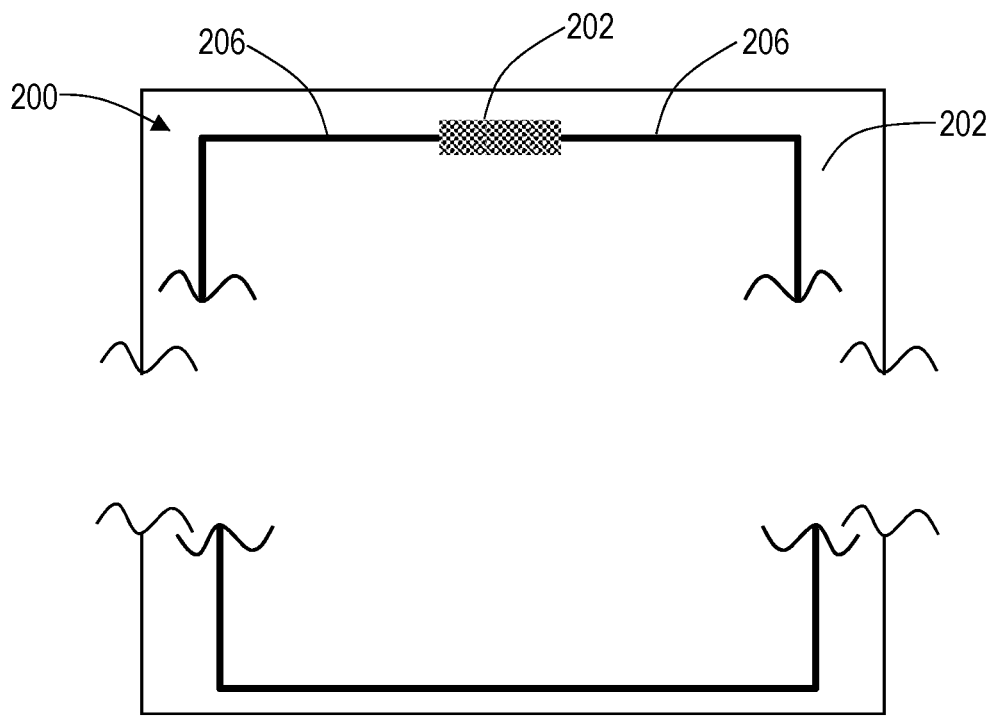
FIG. 2 is a schematic of an electrical circuit on a substrate with the electrically conductive material connecting an interruption in the circuit.

A method of using the electrically conductive material is now described with reference to FIG. 2 in which an electrical circuit 200 is shown formed on a substrate 202. The curvy lines indicate that the circuit or the substrate continues to the next curvy line.

The method includes forming an electrically conductive connection 202 between at least two electrical conductors 206 by contacting the electrical conductors with an electrically conductive material including (a) an anionic polymer having a polymer backbone, a plurality of terminal catechol moieties bonded to the polymer backbone, and a plurality of terminal sulfonate moieties bonded to the polymer backbone; and (b) a cationic polymer including poly(3,4-ethylenedioxythiophene). In this method, the electrically conductive material may be the material described above.

Contacting the electrical conductors with the electrically conductive material may be achieved by directly touching the material to the conductors via an automatic device or by a manual application method. In certain examples, the electrically conductive material is applied in liquid form. Examples of manual application methods may include dispensing the material from a nozzle of a container onto the electrical conductors 206 or using a tool to apply the material to the conductors in a paint-like manner.

After the step of contacting the electrical conductors 206 is completed, the electrically conductive material may be allowed to dry on the conductors 206. Drying may be achieved at room temperature and standard atmospheric pressure. If faster drying is needed, heat and or vacuum may be applied. If heat is applied, the drying temperature should be low enough so as not to damage the substrate 202 on which the electrical conductors 206 are formed.

Examples of the electrically conductive material will adhere to many substrates including conventional semiconductor substrates as well as organic substrates such as, for example, polyethylene terephthalate (PET) and polyethylene naphthalate (PEN). Thus, it may be used to form electrical connections in a circuit that is formed on such a substrate.

In a more particular aspect, an advantageous electrical product includes an electrically conductive adhesive material including a cationic electrically conductive polymer including poly(3,4-ethylenedioxythiophene) (PEDOT) and an anionic polymer including a combination of poly(N-methacryloyl-3,4-dihydroxyl-L-phenylalanine) (PMDOPA) and poly(3-sulfopropyl methacrylate) (PSS). The electrically conducting adhesive material of this product may have any of the features and advantages of the composition described above.

The electrically conductive material has many advantages. Some, but not all of those advantages are now described. It is not necessary for every advantage to apply to every example of the material.

First, the electrical conductivity of the electrically conductive material is comparable to or better than the electrical conductivity of conventional electrically conducting adhesives such as silver paste. This means the electrically conductive material can be used in place of conventional ECAs without sacrificing electrical conductivity.

Second, the electrically conductive materially may be substantially non-toxic. Accordingly, it may be used in biological applications.

Third, thin films of the electrically conductive material of 100 μm thickness and less are very versatile. The films are substantially transparent to visible wavelengths, allowing them to be used in optical applications. The films are also smooth, have low surface roughness, are flexible and adhere well to smooth substrates. This allows the films to be used on flexible substrates and/or transparent substrates.

Fourth, the material is water soluble and has a shelf life in water at standard temperature and pressure of at least 14 days without substantially degrading or substantially losing conductivity. Being water soluble means water can be a carrier for the material instead of an organic solvent that may be toxic.

An aqueous solution of the electrically conductive material may be prepared by mixing it with water. The amount of water can vary. In certain examples the water and electrically conducting material combination is about 0.2% w/w water to about 1% w/w water. The aqueous solution may be used to have a liquid form of the electrically conductive material for ease of application to substrates. In other examples, solvents besides water may be used.

An example of a method of making an electrically conductive material is now discussed.

Poly(N-methacryloyl-3,4-bis(tert-butyldimethylsilyloxy)-L-phenylalanine-co-3-sulfopropyl methacrylate) (PMTS)(3) is prepared by free radical polymerization of N-methacryloyl-3,4-bis(tert-butyldimethylsilyloxy)-L-phenylalanine (MDOPA(TBDMS)$_2$) (1) and 3-sulfoalkyl methacrylate. Then, 3,4-ethylenedioxythiophene (EDOT) monomer is polymerized via oxidative polymerization in a solution of PMTS (3). This reaction yields PMTS:PEDOT (4). By adding HCl to the PMTS:PEDOT solution, the silyl protecting group of PMTS is removed to produce PMS:PEDOT (5).

The free radical polymerization may be initiated using azobisisobutyronitrile (AIBN) when the reaction tempreature is from 60° C. to 100° C. The oxidative polymerization of 3,4-ethylenedioxythiophene (EDOT) may be initiated using a persulfate salt such as, for example, sodium persulfate or potassium persulfate.

In this method, the alkyl group of 3-sulfoalkyl methacrylate may be selected from alkyl groups having from 1 to 10 carbon atoms.

More particular details and examples of the compositions and methods are now described.

EXAMPLES

The following examples are provided to illustrate certain details of specific embodiments of the material and methods. The scope of possible aspects, examples, and embodiments is not limited to the details described here.

Example 1

Synthesis Procedures

Figure 3:
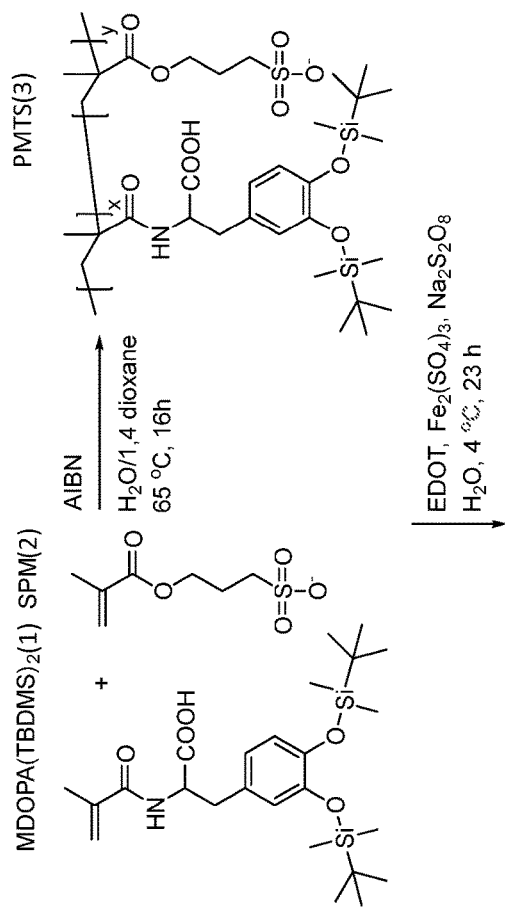
FIG. 3 is a synthesis scheme for preparing PMS:PEDOT (5).
Figure 3:
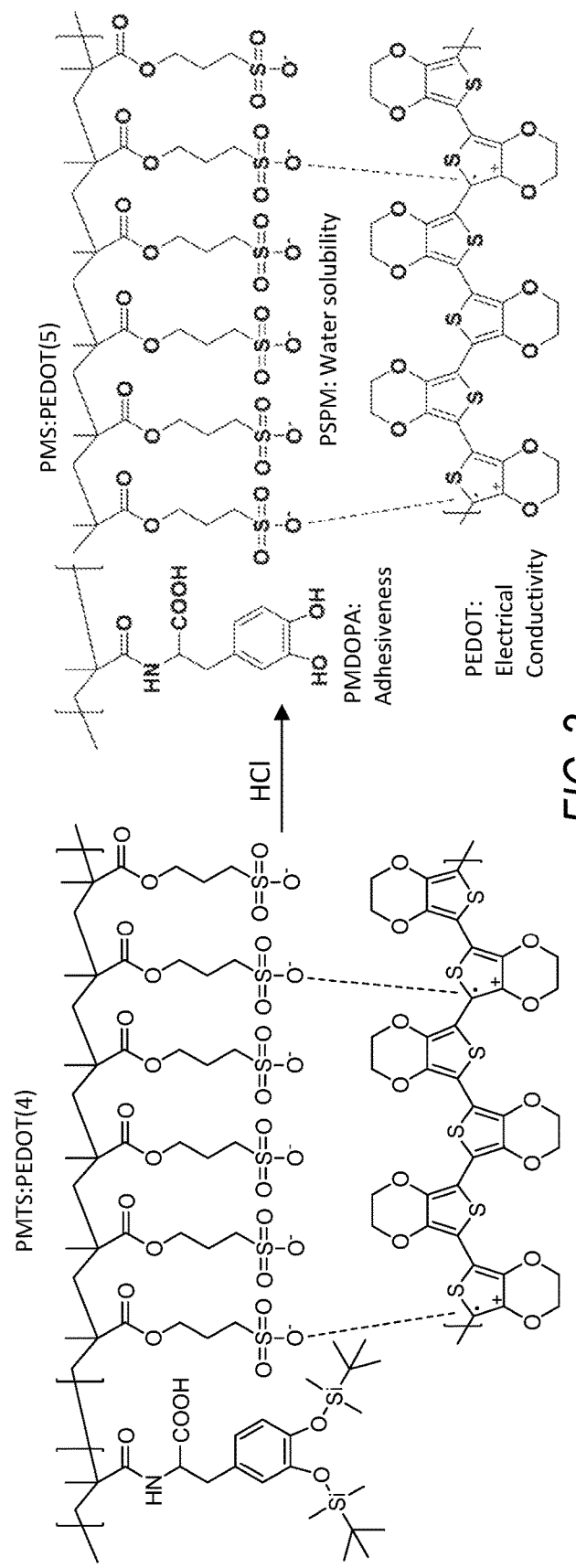

This example describes the procedures used to prepare a particular example of the electrically conductive material, PMS:PEDOT. Scheme 1 in FIG. 3 illustrates the general synthesis strategy. The bold numbers in parenthesis are used to refer to different compounds.

First, poly(N-methacryloyl-3,4-bis(tert-butyldimethylsilyloxy)-L-phenylalanine-co-3-sulfopropyl methacrylate) (PMTS)(3) was synthesized by a thermally-initiated free radical polymerization of N-methacryloyl-3,4-bis(tert-butyldimethylsilyloxy)-L-phenylalanine (MDOPA(TBDMS)$_2$, (1) and 3-sulfopropyl methacrylate (SPM) (2). Then, 3,4-ethylenedioxythiophene (EDOT) monomer was polymerized via oxidative polymerization in an aqueous solution of PMTS (3), yielding the PMTS:PEDOT (4) solution. Finally, the silyl protecting group was removed by the addition of HCl, resulting in PMS:PEDOT (5).

The catechol moiety of the polymer is protected with the silyl group (i.e., tert-butyldimethylsilyl) during synthesis. Oxidation of the catechol group over time can be substantially prevented by the addition of antioxidant compounds (e.g., 2,6-di-tert-butyl-4-methylphenol, 2,6-di-tert-butylphenol, and 6-ethoxy-1,2-dihydro-2,2,4-trimethylquinoline) to quench oxidative radical chemistry. If the antioxidant is used, then the resulting polymer should be monitored carefully to see if there are any undesirable reactions occurring such as oxidation or reduction between PEDOT and the antioxidant.

Unlike the commercial PEDOT:PSS, the newly synthesized polymer has PSPM (6) (see Scheme 1). The PSPM (6) possesses an aliphatic alkyl spacer which is more flexible than the phenyl group on the PSS. PSPM (6) introduces more flexibility to the final polymer. Due to the facile synthetic method, a multigram-scale synthesis was easily achievable, indicating that it might be easily scaled up for mass production.

Additionally, dry PMS:PEDOT (5) is very light and it has high conductivity and adhesion per unit mass unlike metal-containing ECAs. PMS:PEDOT (5) was placed on the top of a dandelion without deforming the dandelion's structural integrity. Once the PMS:PEDOT (5) was synthesized, the electrical conductivity and adhesion strength of the PMS:PEDOT (5) were characterized by a four-probe method and lap shear strength tests, respectively.

Additional synthesis details are now provided.

N-Methacryloyl 3,4-dihydroxy-L-phenylalanine (MDOPA)

Sodium tetraborate decahydrate (19.07 g, 50 mmol, 1.0 equiv.) and 3'(3,4-dihydroxyphenyl)-L-alanine (L-DOPA) (9.86 g, 50 mmol, 1.0 equiv.) were dissolved in 500 mL of Deionized water and degassed with dry nitrogen gas for 20 minutes. Sodium carbonate (10.6 g) was added to the solution to adjust the pH to 9-10. The solution was degassed for another 20 minutes then followed by cooling to 0° C. in an ice bath.

Methacryloyl chloride (6.35 mL, 65 mmol, 1.3 equiv.) was added in a dropwise fashion into the solution. The pH of the solution was adjusted to 9-10 by adding additional sodium carbonate (5.3 g). That solution was degassed for 20 minutes and stirred vigorously at room temperature (23° C.) for 2 hours. The resulting crude solution was acidified using concentrated HCl (25-30 mL) to bring the pH down below 2.

The product was isolated using ethyl acetate (4×150 mL) extraction and the organic layer was collected. The organic layer was then washed with 0.1 M HCl (2×150 mL), brine (2×150 mL), and dried over MgSO$_4$. The remaining solvent was evaporated. The obtained product was purified using column chromatography with 5% MeOH/chloroform (TLC $R_f$=0.30) as an eluent to achieve a sticky pale brown MDOPA powder (10.47 g, 78.96% yield). $^1$H NMR (600 MHz, DMSO-d6, δ ppm): 1.81 (s, 3H), 2.86 (m, 2H), 4.37 (s, 1H), 5.34 (s, 1H), 5.64 (s, 1H), 6.49-6.63 (m, 3H), 7.94 (d, 1H, J=7.68), 8.72 (s, 2H), and 12.63 (s, 1H).

N-Methacryloyl-3,4-bis(tert-butyldimethylsilyloxy)-L-phenylalanine (MDOPA(TBDMS)$_2$) (1)

Tert-Butyldimethylsilyl chloride (TBDMS-Cl) (6.78 g, 45 mmol, 3.0 equiv.) was dissolved in 35 mL of anhydrous acetonitrile in a round bottom flask. MDOPA (4 g, 15 mmol, 1.00 eqv.) was then added into the solution, followed by covering the flask and stirred to allow MDOPA to dissolve completely. The solution was cooled to 0° C. in an ice bath over 30 minutes. 1,8-diazabicyclo[5.4.0]undec-7-ene (DBU) (6.85 g, 45 mmol, 3.0 equiv.) was then added into the solution in a dropwise fashion and solution was stirred at 0° C. for 4 hours. Finally, the reaction was allowed to stir for another 18 hours at room temperature.

The crude product was purified by column chromatography using dichloromethane (DCM) followed by 2% v/v methanol/DCM to remove remaining TBDMS-containing impurities and then the product was obtained by using 5% v/v methanol/DCM (TLC $R_f$=0.45). The solvent was evaporated to obtain the pure product, a pale yellow sticky powder (3.50 g, 46.98% yield). $^1$H NMR (600 MHz, DMSO-d6, δ ppm): 0.16 (s, 12H), 0.94 (s, 18H), 1.78 (s, 3H), 2.89 (m, 2H), 4.39 (s, 1H), 5.32 (s, 1H), 5.62 (s, 1H), 6.70-6.76 (m, 3H), 8.01 (s, 1H), and 12.67 (s, 1H). $^{13}$C NMR (150 MHz, DMSO-d6, δ ppm): −3.76, 18.53, 18.96, 26.21, 35.92, 54.31, 119.86, 120.81, 122.08, 122.69, 131.89, 139.91, 145.03, 146.13, 167.90, and 173.67. HRMS (ESI): calculated for $C_{25}H_{43}NO_5Si_2$ [M+Na]$^+$=516.2572, found 516.2591.

Poly(MDOPA(TBDMS)$_2$-co-3-sulfopropyl methacrylate) (Poly MDOPA(TBDMS)$_2$-co-SPM (PMTS) (3)

MDOPA(TBDMS)$_2$ (1) (1.57 g, 3.18 mmol, 1.00 equiv.), SPM (2) potassium salt (4.44 g, 18 mmol, 5.67 equiv.), and AIBN (0.104 g, 0.64 mmol, 0.2 equiv.) were dissolved in 18 mL of degassed Deionized water/1,4-dioxane (ratio of 1:1 by volume). The solution mixture was degassed by bubbling a stream of nitrogen gas through the solution for 15 minutes. Reaction was then allowed to stir for 16 hours at 65° C. The crude product was purified by dialysis using 10 kD molecular weight cut off membrane in methanol. Methanol was changed every 3 hours and this was repeated four times. Dialysis was repeated in Deionized water and the water was exchanged four times. The final product was freeze-dried to obtain a white colored polymer (4.62 g, 75.80% yield).

Poly(MDOPA-co-SPM):poly(3,4-ethylenedioxythiophene) (PMS:PEDOT) (5)

PMTS (3) (4.32 g) was dissolved in 162 mL of Deionized water followed by degassing with nitrogen gas for 20 minutes while being stirred. 3,4-ethylenedioxythiophene (EDOT) (0.54 g) was added into the solution followed by degassing with nitrogen gas for another 20 minutes while being stirred. The solution was then placed inside of the cold room (4° C.) and allowed to cool down for 15 minutes while being stirring.

Sodium persulfate (SPS, 1.62 g) and Iron(III) sulfate hydrate (32.4 mg) were added to the solution as an initiator and catalyst, respectively and the reaction solution was vigorously stirred at 4° C. for 23 hours. Impurities were removed by dialysis using a 1 kD molecular weight cut off membrane in Deionized water for 1 day to remove the catalyst and initiator. The purified PMTS:PEDOT (4) then underwent deprotection to remove TBDMS by adding concentrated HCl with ratio of 1 mL polymer solution to 0.2 mL concentrated HCl. The impurities were then removed by dialysis using 10 kD molecular weight cut off membrane in methanol followed by Deionized water. Methanol and Deionized water were each replaced every 3 hours and replacement was repeated four times.

The dried PMS:PEDOT (5) was obtained (3.51 g) after freeze-drying. Gelation occurs when the EDOT is polymerized by oxidative radical polymerization without the protection of the catechol group. Semi-quinone radicals are generated by the reaction between the 3,4-dihydroxy-L-phenylalanine (DOPA) and oxidized DOPA. Thus, gelation occurs when the catechol-containing monomer is polymerized by oxidative polymerization due to the reaction between semi-quinone radicals in different polymer chains.

Crosslinking may occur due to the reaction between catechol radicals generated by the reaction between the DOPA and radical in one polymer chain and propagating radical in another polymer chain. Taking these factors into account, it was observed that the gelation during the polymerization of EDOT without catechol protection was due to the crosslinking by the semiquinone-radicals and/or catechol radicals.

Poly(SPM) (PSPM) (6)

SPM (2) potassium salt (2000 mg, 8.12 mmol, 1.00 equiv.) and AIBN (40 mg, 0.24 mmol, 0.03 equiv.) were dissolved in 6.86 mL of degassed Deionized water/1,4 dioxane (ratio of 1:1 by volume). The solution mixture was degassed by bubbling a stream of nitrogen gas through the solution for 15 minutes. The reaction was stirred for 16 hours at 65° C. The crude product was purified by dialysis (10 kD molecular weight cut off dialysis tube) in Deionized water. Deionized water was changed every 3 hours and repeated four times. The final product was freeze-dried to obtain the white colored polymer (1683.6 mg, 82.83% yield).

PMS (8)

Deprotection of PMTS (3) was carried out by removal of the TBDMS groups using concentrated HCl. 200 mg of PMTS (3) was dissolved in 20 mL of Deionized water and 4 mL of concentrated HCl. The solution was allowed to stir at 60° C. for 12 hours. The deprotected polymer, PMS (8), was then purified by dialysis using 10 kD molecular weight cut off membrane in methanol and followed again by Deionized water. Methanol and Deionized water were each replaced every 3 hours and the replacement was repeated four times. PMS (8) was obtained (149.3 mg) after freeze-drying the purified solution.

PSPM: PEDOT (7)

PSPM (6) (490 mg) was dissolved in 21 mL deionized water followed by degassing the solution with a stream of nitrogen gas for 20 minutes while being stirred. EDOT (70 mg) was then added into the PSPM (6) solution followed by degassing for another 20 minutes while being stirred. The solution mixture was brought into a cold room (4° C.) and cooled down for 15 minutes with stirring. SPS (210 mg) as an initiator and iron(III) sulfate hydrate (4.2 mg) as a catalyst were added into the solution sequentially while being stirred. The reaction was vigorously stirred at 4° C. for 23 hours. The product was purified by dialysis using a 1 kD molecular weight cut off membrane with deionized water for 1 day to remove the impurities. The PSPM:PEDOT (7) was obtained (418 mg, 74.64% yield) after freeze-drying the solution.

Example 2

Characterization Experiments

Figure 4:
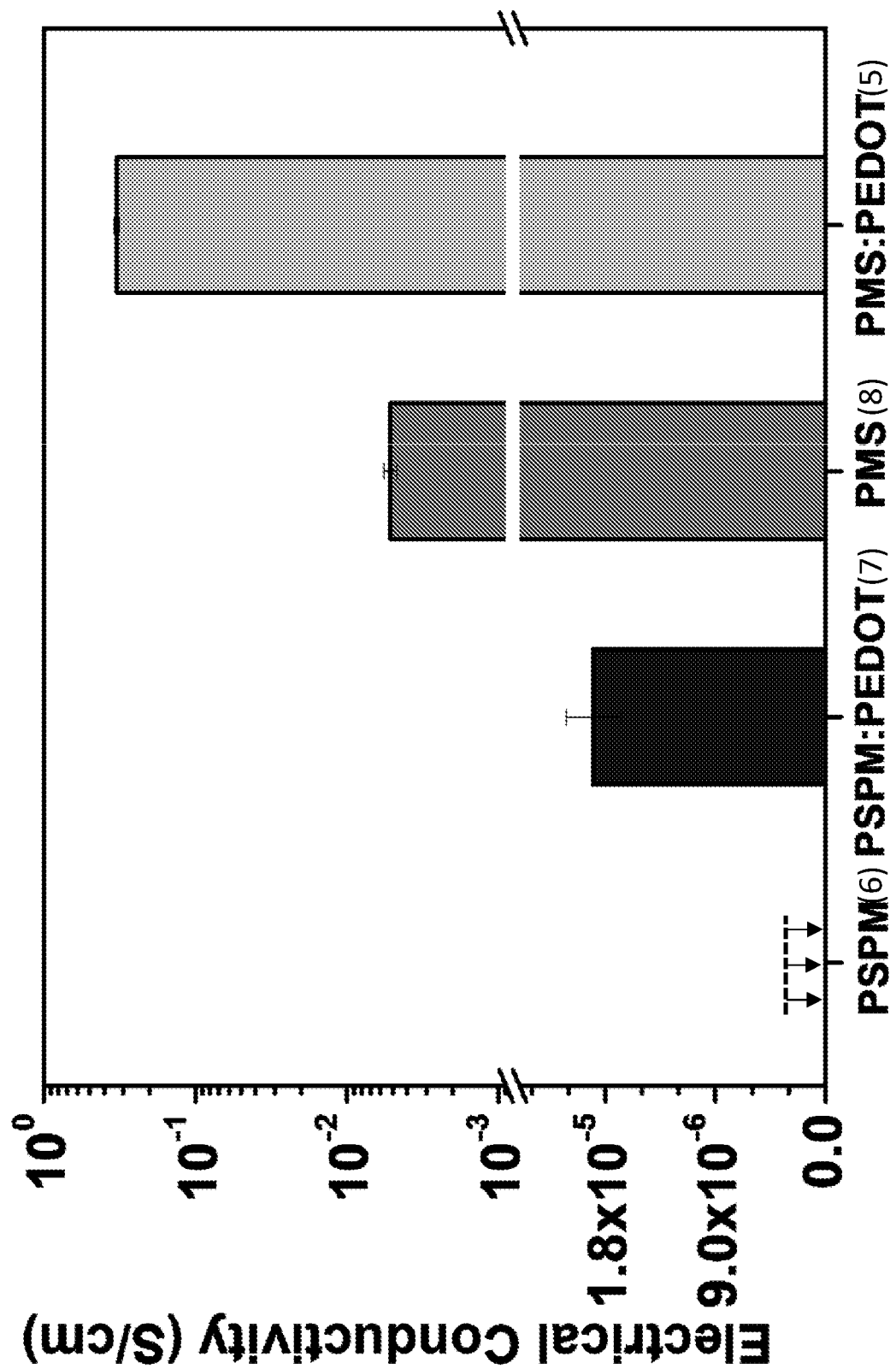
FIG. 4 is a bar graph comparing the electrical conductivity of the materials indicated.

Electrical conductivity measurements. FIG. 4 is a bar graph comparing the electrical conductivity of the materials indicated. PSPM (6) exhibits electrical conductivity lower than $3.0 \times 10^{-6}$ S/cm, indicating that PSPM (6) alone is an almost insulating material.

PSPM:PEDOT exhibits at least a six fold increase in electrical conductivity with the value of $1.9 \times 10^{-5}$ S/cm compared to the electrical conductivity of PSPM (6). This shows that PEDOT improves the electrical conductivity of the polymer.

The copolymer poly(N-methacryloyl-3,4-dihydroxyl-L-phenylalanine-co-3-sulfopropyl methacrylate) (PMS) (8) that is composed of PMDOPA and PSPM has an electrical conductivity of $5.2 \times 10^{-3}$ S/cm, which is at least 3 orders of magnitude better than PSPM (6). This result implies that the PMDOPA segment enhances the electrical conductivity of the polymer.

The polymer including the PMDOPA, PSPM, and PEDOT, PMS:PEDOT (5) has an electrical conductivity of $3.3 \times 10^{-1}$ S/cm which is 5 orders of magnitude greater than that of the PSPM (6). This electrical demonstrates that the incorporation of both PMDOPA and PEDOT yields a large electrical conductivity increase in the polymer.

Flexibility testing. The flexibility of PMS:PEDOT (5) was evaluated on a thin PET film. The PMS:PEDOT (5) conductive line (3 mm width, 0.05 mm thickness, and 6 cm length) was prepared by a stencil-printing method. The printed PMS:PEDOT (5) maintained its original shape without cracks for both unbent and bent (almost 180° bending) states, demonstrating its exceptional flexibility.

Additionally, the brightness of a light-emitting diode (LED) bulb connected to the PMS:PEDOT (5) did not vary when the substrate was flat or bent 180°, showing the excellent electrical conductivity PMS:PEDOT (5) in a wide range of bending states.

Figure 5:
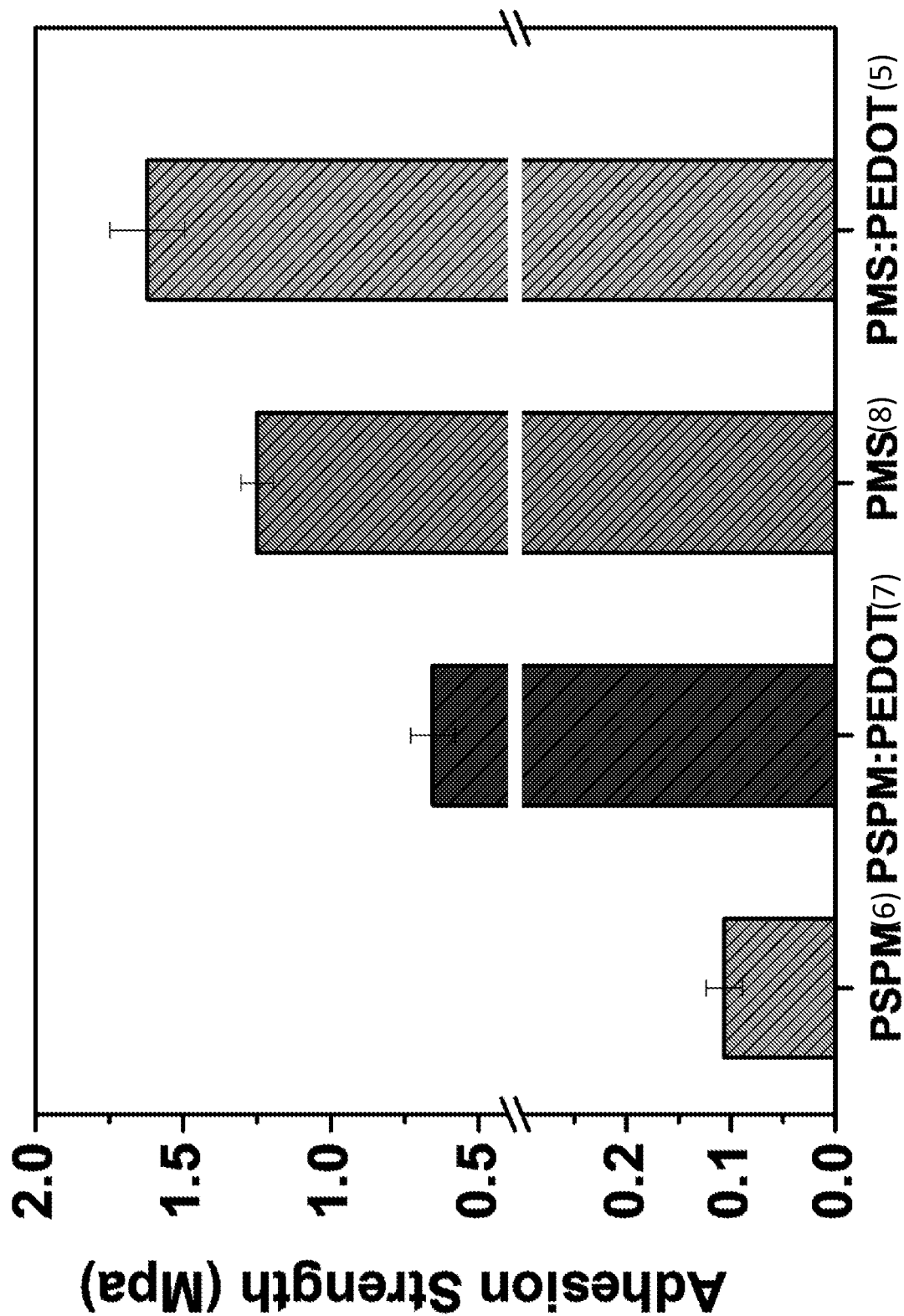
FIG. 5 is a bar graph comparing the adhesion strength of the materials indicated.

Adhesion testing. FIG. 5 is a bar graph comparing the adhesion strength of the indicated polymers. In the adhesion strength test (lap shear strength test), a flexible PET film (0.26 mm thickness) was used as an adherend. PSPM (6) has adhesion strength (maximum adhesion forces in adhesion force vs. displacement plots of $1.06 \times 10^{-1}$ MPa. PSPM:PEDOT (7) has about six-fold increase in adhesion strength with a value of $6.55 \times 10^{-1}$ MPa compared to the that of PSPM (6). PEDOT improved not only the electrical conductivity but also the adhesion strength of the polymer. PMS (8) demonstrated about 11 times improved adhesion strength of 1.25 MPa compared to that of PSPM (6), indicating that the MDOPA moiety largely contributes to the increase in the adhesion strength.

The adhesive was prepared by mixing 14 mg of polymer with 42 μL of deionized water. The wetted polymer was left at 23° C. for 29 hours, producing a water-swollen polymer adhesive. The water-swollen polymer was then applied on 1.4 cm×0.7 cm rectangle area of 1.4 cm×9.0 cm sized PET film (0.26 mm thickness) and topped with another PET film (0.26 mm thickness) subsequently (overlapped area of 1.4 cm×0.7 cm unless otherwise specified). An aluminum block (130 g) was then place on top of the overlapped area for 20 minutes. The prepared sample was then cured for total 24 hours at room temperature, 23° C., prior to the lap shear test.

For the PMS:PEDOT (5) sample, the overlapped area was reduced to 0.7 cm×0.7 cm (not 1.4 cm×0.7 cm) due to the maximum allowed force of the tensile tester.

To prepare the PMS:PEDOT (5) sample, the water-swollen adhesive was first prepared by adding 21 μL deionized water to 7 mg of dried polymer. The wetted polymer was left at 23° C. for 29 hours, yielding a water-swollen polymer adhesive.

The water-swollen polymer was transferred onto a 0.7 cm×0.7 cm area of 0.7 cm×9.0 cm sized PET film and subsequently covered with another PET film (overlapped area of 0.7 cm×0.7 cm), resulting in one sample. The overlapped area of two samples arranged side by side was compressed under 130 g of weight for 20 min. Then, the prepared samples were cured at room temperature (23° C.) for 24 hours prior to lap shear test.

Adhesion strength was measured by conducting a lap shear test using Shimadzu EZ-LX tensile-compression tester machine. The sample was mounted on the lap shear machine grip and pulled apart at speed of 1 mm/min. The data, force vs. displacement, was recorded until the adhesion failure occurred. This testing was repeated at least 4 times and the maximum adhesion strength (MPa) was obtained by dividing the average maximum force (N) by the overlapped area of PET films (m²).

Figure 6:
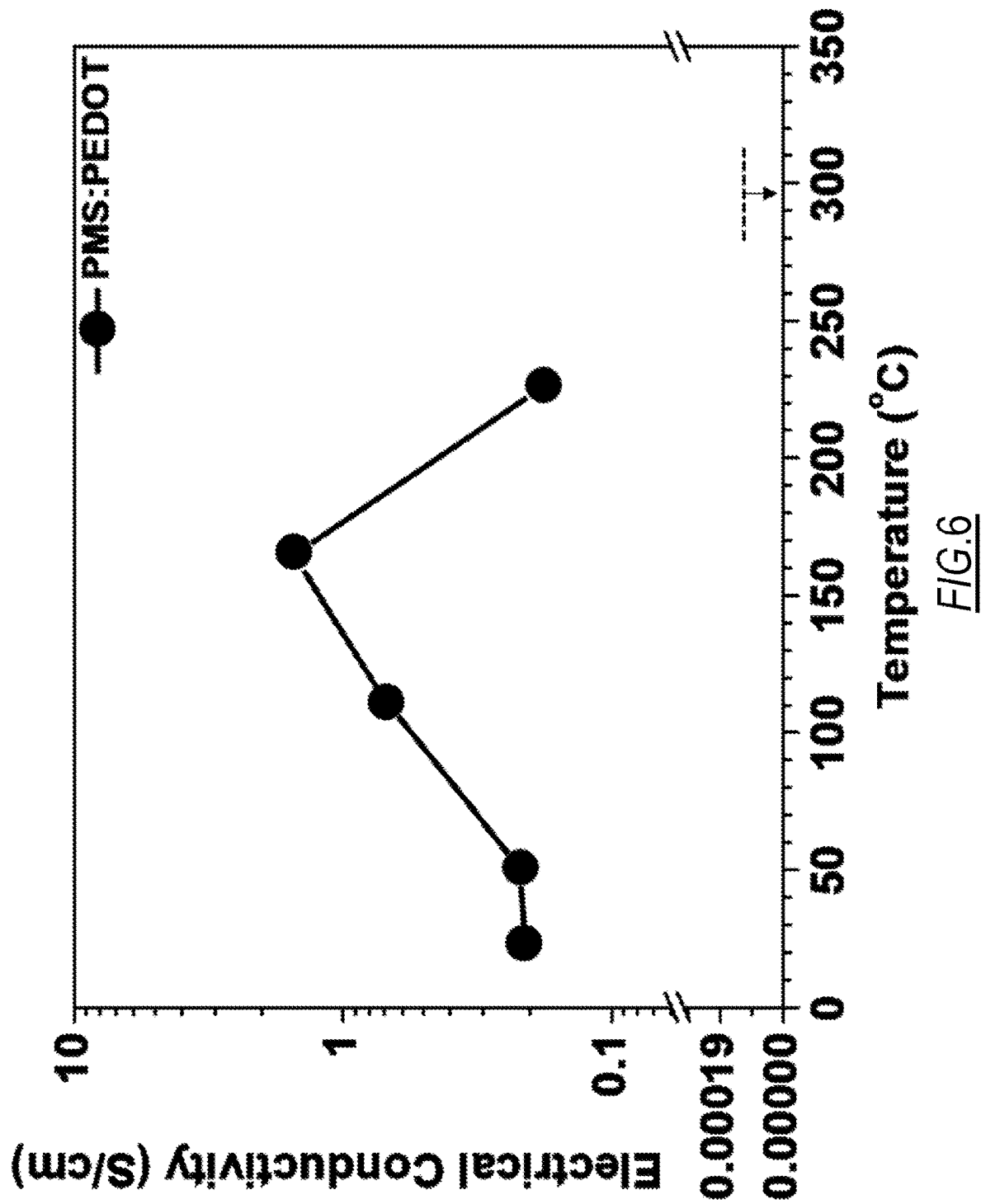
FIG. 6 is a graph of the electrical conductivity of PMS:PEDOT (5) at different annealing temperatures.

Annealing study. The electrical conductivity of PMS:PEDOT (5) can be modified by annealing. FIG. 6 plots the electrical conductivity of spin-coated PMS:PEDOT (5) films at various annealing temperatures. The electrical conductivities of PMS:PEDOT (5) films are $2.1 \times 10^{-1}$, $2.2 \times 10^{-1}$, $6.9 \times 10^{-1}$, 1.5, $1.8 \times 10^{-1}$, and less than $1.9 \times 10^{-4}$ S/cm for annealing temperatures of 23, 50, 111, 165, 226, and 295° C., respectively. The electrical conductivity (1.5 S/cm) of the 165° C. annealed PMS:PEDOT (5) film demonstrated a seven fold improvement compared to the 23° C. annealed sample value ($2.1 \times 10^{-1}$ S/cm). The electrical conductivity of PMS:PEDOT (5) film is proportionally increased until the annealing temperature of 165° C. This indicates that the annealing process generally improves electrical conductivity of PMS:PEDOT (5). However, annealing temperatures of 226 and 295° C., showed different results compared to the general trend.

Solvent study. Polar organic solvents such as glycerol, dimethyl sulfoxide (DMSO), or ethylene glycol effect the electrical conductivity of PMS:PEDOT. This section reports glycerol's effect on the electrical conductivity.

The weight ratio between the PMS:PEDOT (5) and glycerol was controlled as 13:0 (No glycerol), 13:8 (38 wt % of glycerol), 13:16 (55 wt % of glycerol), and 13:24 (65 wt % of glycerol). The corresponding PMS:PEDOT (5) samples are named as PMS:PEDOT-0%, PMS:PEDOT-38%, PMS:PEDOT-55%, and PMS:PEDOT-65%, respectively. For the electrical conductivity measurements, the mixture of PMS:PEDOT (5), glycerol, and water for each condition was spin-coated on a pre-cleaned cover glass followed by 10 minutes of drying at 134° C.

Figure 7:
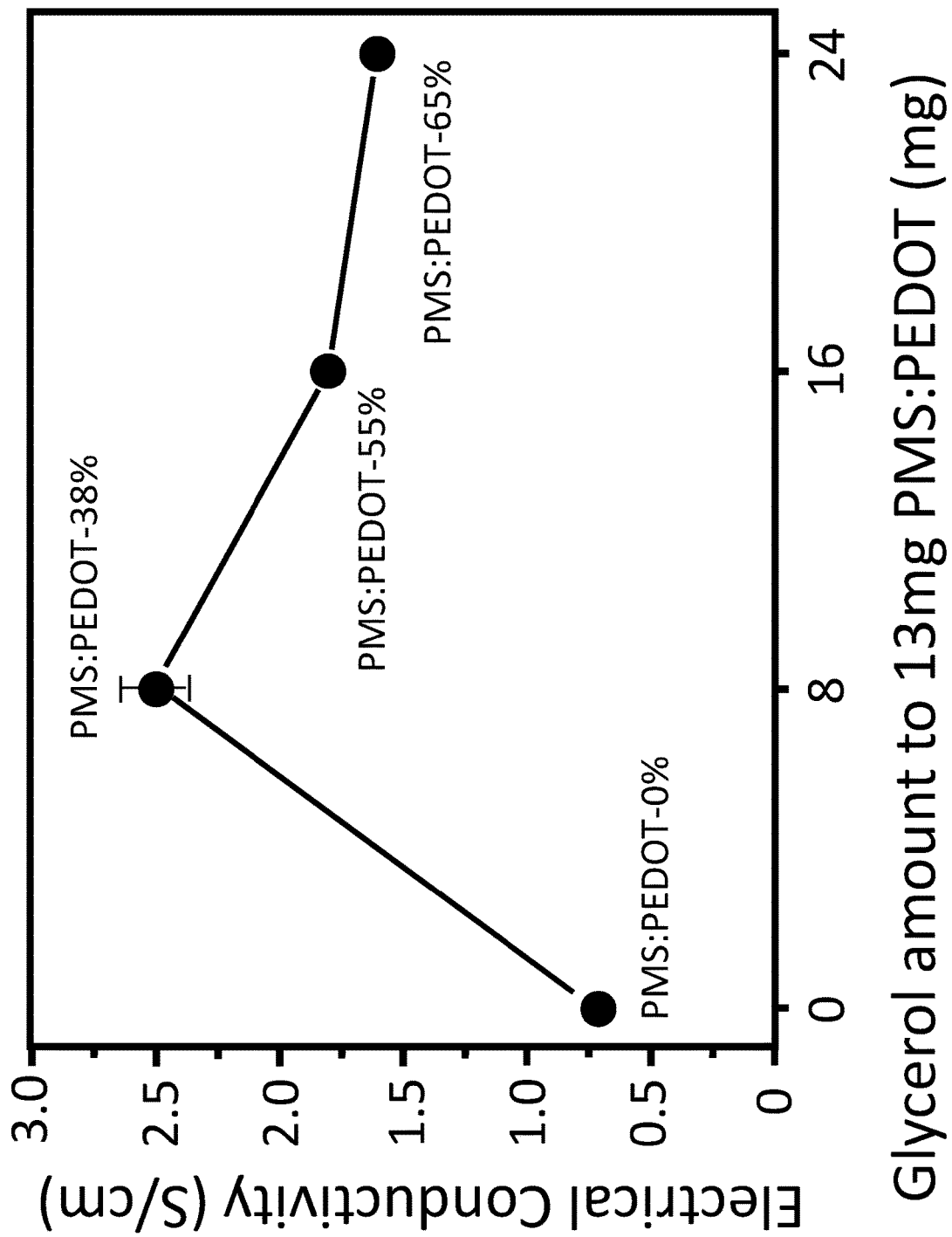
FIG. 7 is a graph of the electrical conductivity of PMS:PEDOT (5) with various amounts of glycerol additive.

FIG. 7 shows that the electrical conductivity of PMS:PEDOT-0% is $7.0 \times 10^{-1}$ S/cm. After the addition of the glycerol to the polymer (PMS:PEDOT-38% film) followed by annealing, the elect electrical conductivity increased to 2.5 S/cm, which is 4 times higher than that of PMS:PEDOT-0%. Note that PMS:PEDOT-38% exhibits electrical conductivity which is comparable to the electrical conductivity of recently reported metal-polymer composites.

The observed electrical conductivity enhancement may be due to the slight phase separation between the PMS (8) and PEDOT chains by hydrogen bonding between the glycerol and the PSPM (6). When the weight percent of the glycerol to the polymer further increased to 55% and 65% (PMS:PEDOT-55% and PMS:PEDOT-65%), the electrical conductivity decreased to 1.8 and 1.6 S/cm.

Transmittance testing. Spin-coated PMS:PEDOT (5) and glycerol containing PMS:PEDOT (5) are both transparent and homogeneous. Transmittance (UV/vis characterization), surface resistance ($R_s$, 4-probe method), and surface roughness of the films (atomic force microscopy (AFM) characterization) were characterized to investigate the new polymer's potential in electronic device manufacturing such as next generation displays and energy storage devices.

Figure 8:
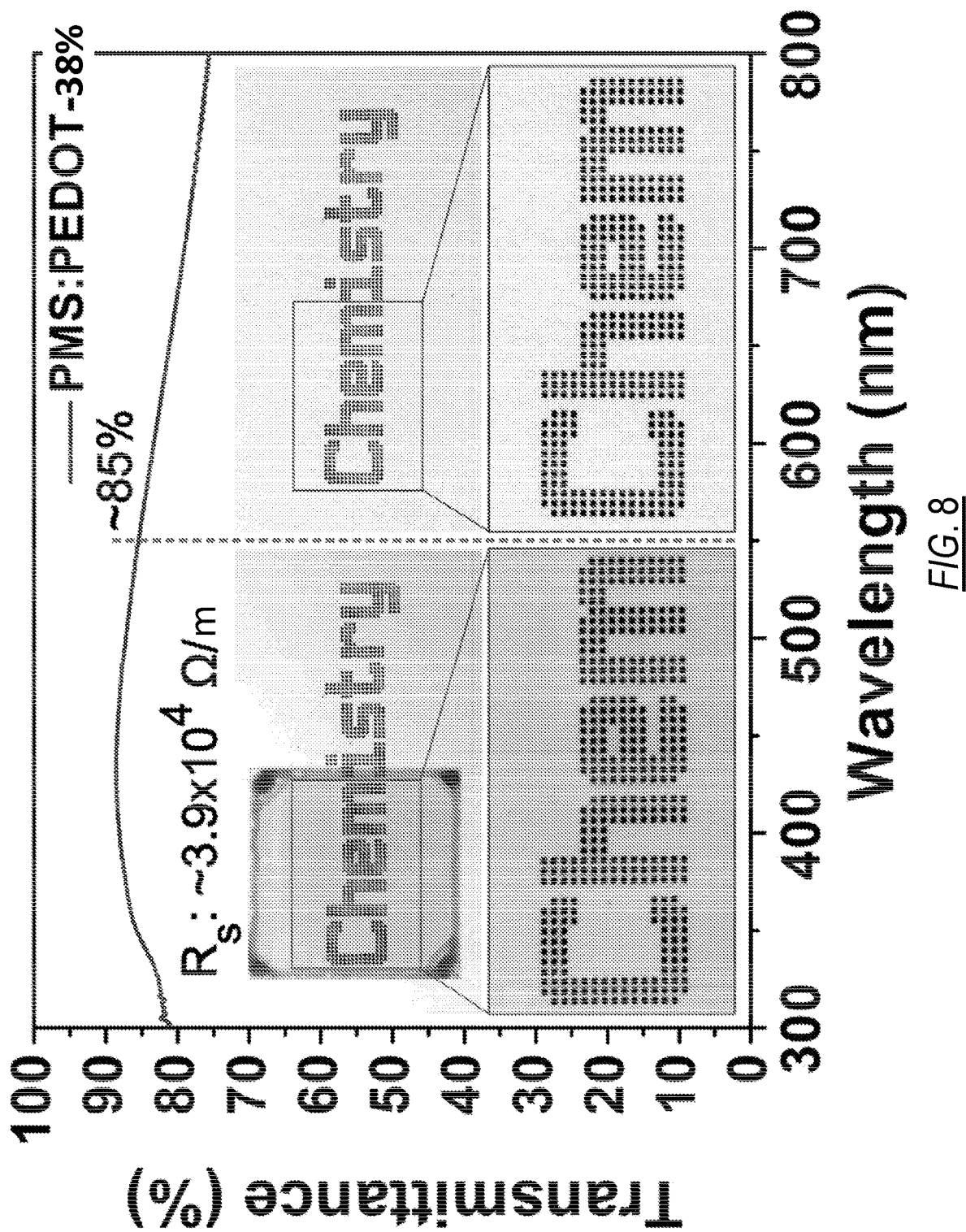
FIG. 8 is a graph of the transmittance and surface resistance ($R_s$) of a PMS:PEDOT-38% film. The left inset photograph shows the PMS:PEDOT-38% film over the printed word "Chemistry". The right inset photograph displays the word "chemistry" on the paper without PMS:PEDOT-38% film. The bars in the inset photographs represent 0.5 cm.

For these experiments, PMS:PEDOT-38% was used because it had the highest electrical conductivity. As shown in FIG. 8, the PMS:PEDOT-38% film exhibits a transmittance of ~85% at λ=550 nm. The left inset photograph of FIG. 8 shows that the visual transmittance is high enough to easily identify small dots making up the word "Chemistry." The right inset photograph depicts the printed letters on the photo paper without the polymer film.

Annealed PMS:PEDOT (5) without added glycerol also has a high transmittance of ~82% at λ=550 nm. With the high transmittance, the PMS:PEDOT-38% film exhibited a $R_s$ of ~$3.95 \times 10^4$ Ω/□.

Figure 9:
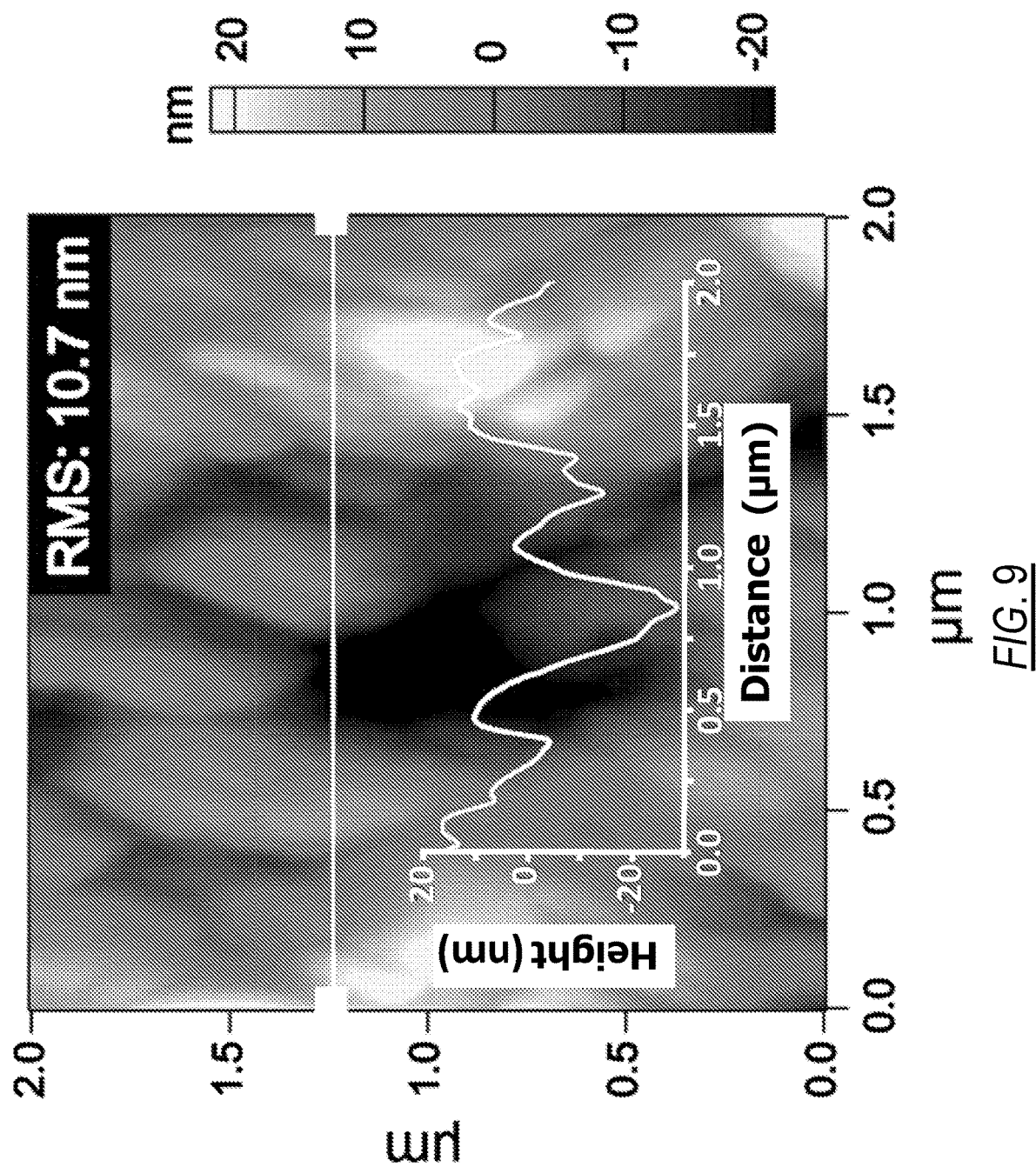
FIG. 9 is an atomic force microscope image (AFM) of the PMS:PEDOT-38% film. The inset is a cross section measurement along the white line shown in the AFM image.

Surface roughness study. Low surface roughness is preferable for a conducting polymer's application. The root mean square (RMS) surface roughness of the PMS:PEDOT-38% film is only ~10.7 nm according to the AFM analysis (FIG. 9). This RMS value indicates a smooth and uniform surface of the PMS:PEDOT 38% film.

PMS:PEDOT (5) films with no glycerol and no annealing also showed a smooth and uniform surface (RMS is ~22.4 nm.

Overall, the obtained transmittance, $R_s$, and RMS of PMS:PEDOT-38% show that it may be used as a transparent conductive electrode material.

Figure 10:
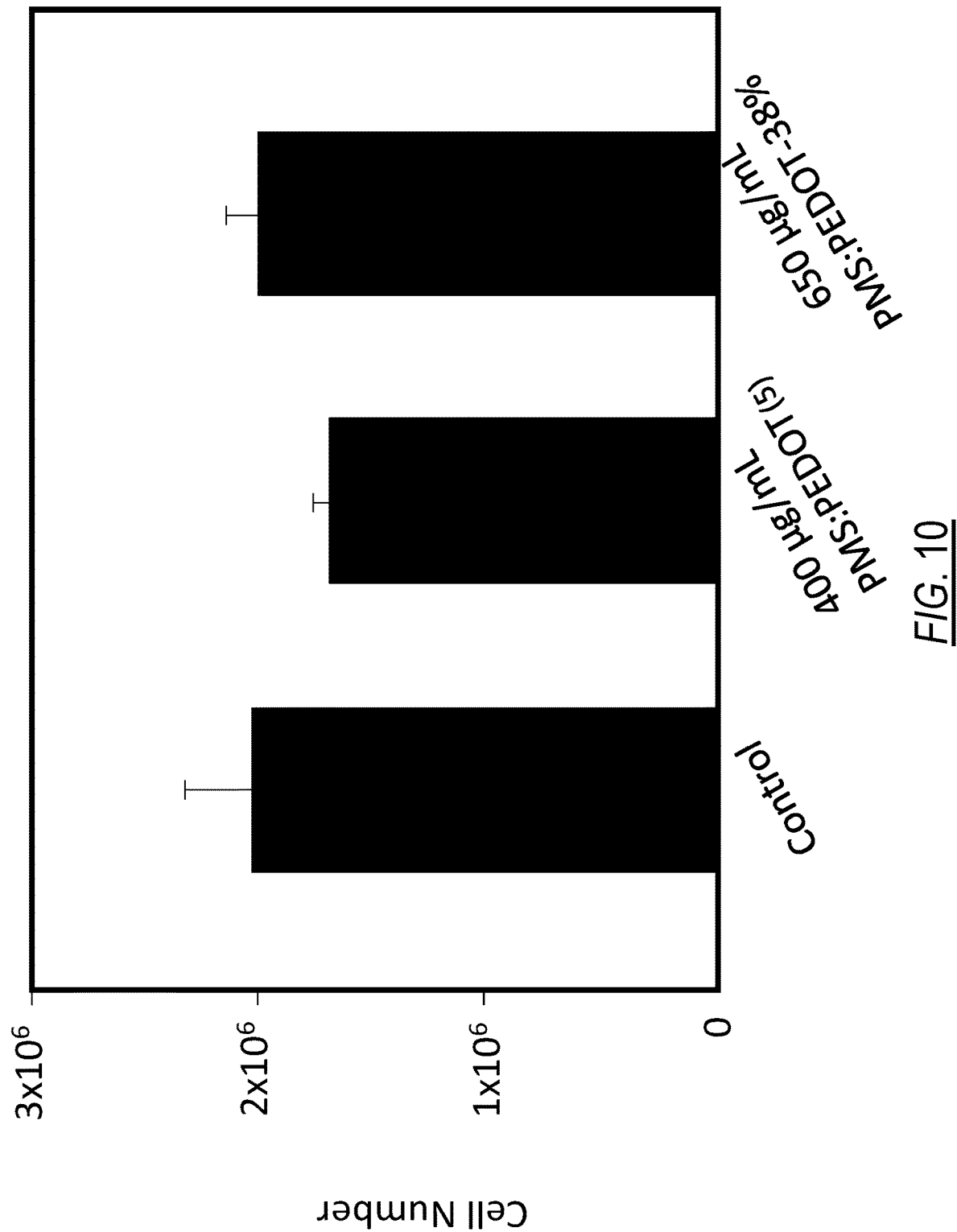
FIG. 10 is a bar graph showing the number of HEK293A cells treated with PMS:PEDOT (5) (400 μg/mL) and glycerol containing PMS:PEDOT (5) ((PMS:PEDOT (5) 400+ glycerol 250) μg/mL). Untreated cells were used as a negative control.

Cytotoxicity study. In-vitro cytotoxicity experiments were conducted to assess the biocompatibility of PMS: PEDOT (5) and PMS:PEDOT-38%. The cytotoxicity experiments were conducted using human embryonic kidney (HEK) cell lines to evaluate cell proliferation. Based on the cell count after 48 h incubation (FIG. 10), there is no statistically significant cell population difference between the control medium and the PMS:PEDOT (5) treated medium (400 µg of PMS:PEDOT (5)/mL in cell medium, p-value=0.908). The glycerol containing PMS:PEDOT (5) (650 µg of PMS:PEDOT-38%/mL in cell medium, p-value=0.997) also did not show cell cytotoxicity. No significant cytotoxicity up to 400 µg/mL indicates that the product (PMS:PEDOT) is biocompatible.

Electrical connectivity study. PMS:PEDOT (5) was evaluated as an interconnecting material to connect separated electronic components on a traditional non-flexible circuit board. The light bulbs in a commercially available soldering practice kit did not light up when the circuit was interrupted. However, the bulbs illuminated once PMS: PEDOT (5) was applied to the printed circuit board to connect the electrical leads.

PMS:PEDOT (5) was also used to repair disconnected electrical leads on a thin, flexible PET substrate. The disconnected leads were linked by using the PMS:PEDOT (5) solution (PMS:PEDOT (5)+glycerol+deionized water, PMS: PEDOT-38%). After connecting with the PMS:PEDOT (5) solution, the LED lightbulb illuminated. This shows that PMS:PEDOT (5) is suitable for cold-soldering purposes.

A simple electrical circuit utilizing LED bulbs was prepared from PMS:PEDOT (5), glycerol, electrical wire, and batteries. The PMS:PEDOT conducting material composed of PMS:PEDOT (5), glycerol, and deionized water with a ratio of PMS:PEDOT (5) to glycerol of 13:8 (38 wt %) was first stencil-printed on a flexible PET substrate (0.09 mm thickness). The printed electrical lines were then annealed at 134° C. for 10 min., resulting in stencil-printed PMS: PEDOT-38% electrical lines (0.3 cm width and 0.03 mm thickness). The cathode and anode of the LED bulb penetrating the PET film were interconnected with the PMS: PEDOT-38% on PET film. The two LED bulbs illuminated when power was supplied.

The following is a list of acronyms used herein.

| AFM | atomic force microscopy |
|---|---|
| DI | deionized |
| DMSO | dimethyl sulfoxide |
| DOPA | 3,4-dihydroxy-L-phenylalanine |
| ECAs | electrically conductive adhesives |
| HEK | human embryonic kidney |
| ICPs | intrinsically conducting polymers |
| LED | light-emitting diode |
| MDOPA(TBDMS)2 | N-Methacryloyl-3,4-bis(tert-butyldimethylsilyloxy)-L-phenylalanine |
| PEDOT | poly(3,4-ethylenedioxythiophene) |
| PEG | polyethylene glycol |
| PET | polyethylene terephthalate |
| PMDOPA | poly(N-methacryloyl-3,4-dihydroxyl-L-phenylalanine) |
| PMS | poly(N-methacryloy1-3,4-dihydroxyl-L-phenylalanine-co-3-sulfopropyl methacrylate) |
| PMTS | poly(N-methacryloyl-3,4-bis(tert-butyldimethylsilyloxy)-L-phenylalanine-co-3-sulfopropyl methacrylate) |
| PSPM | poly(3-sulfopropyl methacrylate) |
| PSS | poly(styrenesulfonate) |
| RMS | root mean square |
| SPM | 3-sulfopropyl methacrylate |

This disclosure describes certain exemplary embodiments, but not all possible embodiments of the composition and methods. Where a particular feature is disclosed in the context of a particular example, that feature can also be used, to the extent possible, in combination with and/or in the context of other examples. The composition and methods may be embodied in many different forms. The claims should not be construed as being limited only to the examples or features described here.

That which is claimed is:

1. A composition comprising an electrically conductive material including (a) an anionic polymer having a polymer backbone, a plurality of terminal catechol moieties bonded to the polymer backbone, and a plurality of terminal sulfonate moieties bonded to the polymer backbone; and (b) a cationic polymer including poly(3,4-ethylenedioxythiophene).

2. The composition of claim 1, wherein the polymer backbone includes at least one of polymethylmethacrylate and polyacrylic acid.

3. The composition of claim 1, wherein the plurality of terminal catechol moieties bonded to the polymer backbone include N-methacryloyl-3,4-dihydroxyl-L-phenylalanine (MDOPA).

4. The composition of claim 1, wherein the plurality of terminal sulfonate moieties bonded to the polymer backbone include 3-sulfoalkyl methacrylate.

5. The composition of claim 4, wherein the 3-sulfoalkyl methacrylate is 3-sulfopropyl methacrylate.

6. The composition of claim 1, further comprising a polar organic solvent effective for increasing an electrical conductivity of the electrically conductive material relative to the electrical conductivity of the electrically conductive material without the solvent.

7. The composition of claim 6, wherein the solvent is selected from at least one of glycerol, dimethylsulfoxide, and ethylene glycol.

8. The composition of claim 1, further comprising electrical wiring and wherein the electrically conductive material is adhered to the electrical wiring.

9. The composition of claim 1, wherein:
 the polymer backbone includes at least one of polymethylmethacrylate and polyacrylic acid;
 the plurality of terminal catechol moieties bonded to the polymer backbone include N-methacryloyl-3,4-dihydroxyl-L-phenylalanine (MDOPA); and
 the plurality of terminal sulfonate moieties bonded to the polymer backbone include 3-sulfoalkyl methacrylate.

10. A product comprising an electrically conductive adhesive material including a cationic electrically conductive polymer including poly(3,4-ethylenedioxythiophene) (PEDOT) and an anionic polymer including a combination of poly(N-methacryloyl-3,4-dihydroxyl-L-phenylalanine) (PMDOPA) and poly(3-sulfopropyl methacrylate) (PSPM).

11. The product of claim 10, wherein a molecular weight of the electrically conductive adhesive material is 5000 Dalton to 5,000,000 Dalton.

12. The product of claim 10, further comprising a polar organic solvent effective for increasing an electrical conductivity of the electrically conductive adhesive material relative to the electrical conductivity of the electrically conductive adhesive material without the solvent.

13. The product of claim 12, wherein the solvent is selected from at least one of glycerol, dimethylsulfoxide, and ethylene glycol.

14. The product of claim 10, further comprising electrical wiring and wherein the electrically conductive adhesive material is adhered to the electrical wiring.

15. A method comprising forming an electrically conductive connection between at least two electrical conductors by contacting the electrical conductors with an electrically conductive material including (a) an anionic polymer having a polymer backbone, a plurality of terminal catechol moieties bonded to the polymer backbone, and a plurality of terminal sulfonate moieties bonded to the polymer backbone; and (b) a cationic polymer including poly(3,4-ethylenedioxythiophene).

16. The method of claim 15, wherein the polymer backbone includes at least one of polymethylmethacrylate and polyacrylic acid.

17. The method of claim 15, wherein the plurality of terminal catechol moieties bonded to the polymer backbone include N-methacryloyl-3,4-dihydroxyl-L-phenylalanine (MDOPA).

18. The method of claim 15, wherein the plurality of terminal sulfonate moieties bonded to the polymer backbone include 3-sulfoalkyl methacrylate.

19. The method of claim 18, wherein the 3-sulfoalkyl methacrylate is 3-sulfopropyl methacrylate.

20. The method of claim 15, wherein the electrically conductive material includes a polar organic solvent effective for increasing an electrical conductivity of the electrically conductive material relative to the electrical conductivity of the electrically conductive material without the solvent.

21. The method of claim 20, wherein the solvent is selected from at least one of glycerol, dimethylsulfoxide, and ethylene glycol.

22. The method of claim 15, wherein:
the polymer backbone includes at least one of polymethylmethacrylate and polyacrylic acid;
the plurality of terminal catechol moieties bonded to the polymer backbone include N-methacryloyl-3,4-dihydroxyl-L-phenylalanine (MDOPA); and
the plurality of terminal sulfonate moieties bonded to the polymer backbone include 3-sulfoalkyl methacrylate.

23. A method of making an electrically conductive material, the method comprising:
preparing poly(N-methacryloyl-3,4-bis(tert-butyldimethylsilyloxy)-L-phenylalanine-co-3-sulfopropyl methacrylate) (PMTS) by free radical polymerization of N-methacryloyl-3,4-bis(tert-butyldimethylsilyloxy)-L-phenylalanine (MDOPA(TBDMS)$_2$) and 3-sulfoalkyl methacrylate;
producing poly(N-methacryloyl-3,4-bis(tert-butyldimethylsilyloxy)-L-phenylalanine-co-3-sulfopropyl methacrylate):poly(3,4-ethylenedioxythiophene) (PMTS:PEDOT) by oxidative polymerization of 3,4-ethylenedioxythiophene (EDOT) in a solution of PMTS; and
removing silyl protecting groups of PMTS to yield poly(N-methacryloyl-3,4-dihydroxyl-L-phenylalanine-co-3-sulfopropyl methacrylate):poly(3,4-ethylenedioxythiophene) (PMS:PEDOT).

24. The method of claim 23, wherein the free radical polymerization is initiated using azobisisobutyronitrile (AIBN) with a reaction temperature from 60° C. to 100° C.

25. The method of claim 23, wherein the oxidative polymerization of EDOT is initiated using a persulfate salt.

26. The method of claim 23, wherein the alkyl group of 3-sulfoalkyl methacrylate is selected from alkyl groups having from 1 to 10 carbon atoms.

* * * * *